United States Patent [19]
Kirkland

[11] Patent Number: 5,900,908
[45] Date of Patent: May 4, 1999

[54] SYSTEM AND METHOD FOR PROVIDING DESCRIBED TELEVISION SERVICES

[75] Inventor: C. Eric Kirkland, Rockville, Md.

[73] Assignee: National Captioning Insitute, Inc., Fairfax, Va.

[21] Appl. No.: 08/591,101

[22] Filed: Jan. 25, 1996

Related U.S. Application Data

[63] Continuation-in-part of application No. 08/398,165, Mar. 2, 1995.

[51] Int. Cl.$^6$ ........................................... H04N 7/08
[52] U.S. Cl. .......................... 348/62; 348/738; 348/553; 348/461
[58] Field of Search .................................... 348/461, 553, 348/564, 465, 552, 478, 480, 467, 725, 460, 62, 482, 484, 738, 468; 704/260, 271, 277

[56] References Cited

U.S. PATENT DOCUMENTS

| | | |
|---|---|---|
| 4,000,565 | 1/1977 | Overby et al. . |
| 4,378,569 | 3/1983 | Dallas, Jr. et al. . |
| 4,406,626 | 9/1983 | Anderson et al. . |
| 4,535,356 | 8/1985 | Nakagawa et al. . |
| 4,700,322 | 10/1987 | Benbassat et al. . |
| 5,219,291 | 6/1993 | Fong et al. . |
| 5,235,415 | 8/1993 | Bonicel et al. . |
| 5,302,132 | 4/1994 | Corder . |
| 5,515,443 | 5/1996 | Salomon .................................. 348/461 |
| 5,561,457 | 10/1996 | Cragun et al. ........................... 348/553 |

*Primary Examiner*—Victor R. Kostak

[57] ABSTRACT

An apparatus for providing described television services includes a receiver for receiving description data corresponding to an audiovisual program; a text-to-speech converter for converting the description data into a speech signal corresponding to the description data; a memory device for receiving and storing the speech signal and a corresponding time code from the audiovisual program; a mixing circuit for retrieving the speech signal from the memory device and mixing the retrieved speech signal with the audio track of the audiovisual program to produce a combined audio signal; and a transmitter for simultaneously providing the combined speech signal and the audiovisual program to a viewer. The apparatus provides the combined speech signal to the viewer via the SAP channel. The apparatus may also include a translator for translating the description data into a foreign language prior to converting the description data into the speech signal.

A method for providing described television services includes the steps of generating description data corresponding to an audiovisual program; converting the description data to a speech signal corresponding to the description data; synchronizing the speech signal with the audiovisual program using a time code signal from the audiovisual program; mixing the synchronized speech signal with the audio track of the audiovisual program to create a combined audio signal; and simultaneously transmitting the combined audio signal and the audiovisual program to the viewer.

12 Claims, 6 Drawing Sheets

SYSTEM AND METHOD FOR PROVIDING DESCRIBED TELEVISION SERVICES

RELATED APPLICATIONS

This application is a continuation-in-part of U.S. patent application Ser. No. 08/398,165, filed Mar. 2, 1995 of the same inventor.

FIELD OF THE INVENTION

The present invention relates to an apparatus and method for providing described television services by which a viewer is provided with an audio description of non-spoken aspects of a television program, for example, the program's background scenery or non-verbal actions of characters.

BACKGROUND OF THE INVENTION

Television programs, plays, and other audiovisual types of presentations often include both an audio component and a visual component, each of which conveys information to a viewer. Closed captions may be provided for audiovisual programs and presentations in order to allow people with impaired hearing to follow the audio component of the program or presentation. Similarly, an audio description of the presentation may be provided to enable people with impaired vision to follow the visual component of the program or presentation. The provision of such an audio description for television programs is referred to as described television services.

Currently, described television services are not widely available. Several television stations, such as WGBH (Boston, Mass.), provide some described television programs using the second audio program (SAP) of these television programs to transmit the description information.

Described television programs using SAP are currently produced using a process as follows. First, an original tape of the final version of the program, including all dialogue and sound effects, is obtained from a network. If the copy includes a SAP track, for example, a Spanish version of the audio track of the program, this track is lost in the process of providing description information. Second, editors prepare concise, typewritten descriptions of the scenes of the program. Third, one or more professional speakers read the descriptions. Typically, a single speaker reads the descriptions in a soft voice, almost as if he/she was whispering the scene details to the blind viewer. Fourth, the "final" audio track from the original program is re-mastered to be monophonic (SAP can only carry a mono signal) and to include the descriptions as high fidelity monophonic signals. This re-mastering process requires a broadcast quality audio facility. Fifth, the original program is re-mastered to record the SAP track along with the other signals (e.g., the program's video and audio signals) which, according to present television capabilities, may be compressed digital audio stereophonic signals. Finally, the new tape, which is a "generation" down from the original program tape, is returned to the network.

Once the network has received the tape, it may either broadcast the new tape or "slave" the original tape and the new tape together using two tape decks and coordinating the two signals using the standard (SMPTE) time code of the tapes. In the "slave" process, the original tape is used to provide the video and sound (e.g., stereo) of the program, and the new tape is used to provide the SAP track for the program which is inserted into the signal at broadcast time. The slave process has an advantage in that, if the original program has a SAP track (e.g., a Spanish SAP), the original SAP track may be used on some occasions and the description SAP track on other occasions.

There are also audio tape decks that may be slaved to video tape decks to provide the description SAP track for the program. The use of an audio tape player has an advantage in that it eliminates the need to re-master the audio track of the original program as described above.

Thus, since the known method of providing described television services is cumbersome, there is a need for a method of providing described television services by which the descriptions are easily produced and transmitted to viewers.

SUMMARY OF THE INVENTION

In view of the above discussion, it is an object of the present invention to provide an innovative apparatus and method for providing described television services.

According to a first embodiment of the present invention, described television services for a program are provided by encoding the descriptions as text characters into the vertical blanking interval of the video signal of the program, for example, in line 21 of the standard NTSC television signal. The data signal on line 21 consists of independent data on field 1 and field 2. Each data channel may contain specific types of data packets as shown in the following table.

| Field 1 Packets | Field 2 Packets |
| --- | --- |
| CC1 (F1,C1)-Primary Synchronous Captions | CC3 (F2,C1)-Secondary Synchronous Captions |
| CC2 (F1,C2)-Special Non-Synchronous Captions | CC4 (F2,C2)-Secondary Non-Synchronous Captions |
| T1 (First Text Service) | T3 (Third Text Service) |
| T2 (Second Text Service) | T4 (Fourth Text Service) |
|  | EDS-Extended Data Service |

The Primary Synchronous Caption Service CC1 is primary language (e.g., English) captioning data that must be in sync with the sound of a program, preferably in sync with a specific frame. The Secondary Synchronous Caption Service CC3 is an alternate captioning data channel usually used for second language captions.

The Special Non-Synchronous channels CC2 and CC4 carry data that is intended to augment information carried in the program and need not be in sync with the sound. Delays of several seconds within the program are to be expected and do not affect the integrity of the data.

Text Service data are generally not program related. The data are generally displayed as soon as they are received and are intended to be displayed in a manner which isolates them from the video program used to transmit the data. Once the display window created by the decoder is filled, text data are scrolled upward through the display window.

The Extended Data Service (EDS) is a third data service on field 2 which is intended to supply program related and other information to the viewer. Types of information provided by EDS include current program, title, length of the program, type of program, time of program, time remaining in program, and other types of program-related information. This information may be used, for example, to help a viewer determine what program is on even during a commercial. Future program and weather alert information may also be displayed.

Further description of the line 21 data services, recommended formats of each service, and other detailed information is provided in the Electronic Industries Association publication of September, 1994 entitled "EIA-608 Recommended Practice for Line 21 Data Service." Moreover, the present invention should not be considered limited to the NTSC standard television signal. One of ordinary skill in the art practicing the present invention may adapt the present technology suitably for PAL, SECAM, high definition television, digital television or other formats or MPEG or other compression video formats as appropriate.

Description data as used in the present application and claims may be defined as auxiliary data transmitted for the purpose of describing the non-verbal portion of an audiovisual program. Description data typically may comprise text data, but also may comprise compressed text or graphical, symbolic, or numeric data. The description data may share channel C1 using a special marker to indicate which data is caption data and which is description data. Since descriptions, by definition, occur when the actors are not speaking, the caption data and the description are complementary and many be transmitted on the same channel. The description data may also be transmitted using CC2, CC3 or CC4 which are not currently in use for captioning; or Extended Data Services (EDS) as defined by the Electronic Industries Association (EIA) if coding is developed consistent with the EIA recommendations, or any other line of the vertical blanking interval. Text services (T1-4) as defined by the EIA may also be used to carry the descriptions.

In the first embodiment of the present invention, a decoder, e.g., a set-top or built-in decoder, extracts and stores description text characters received as a component of the television program signal. When a complete utterance is received, a "speak" command similar to a "display" command for captions is received. The "speak" command triggers the input of the stored description text into a text-to-speech synthesizer which generates audible speech corresponding to the description text. The synthesized voice may be provided to the viewer using a secondary speaker attached to the set-top unit or using the built-in television speakers when the decoder unit is built-in to the television set. The synthesized voice may also be transmitted to a blind viewer using wire or wireless technology (e.g., infrared or frequency modulated (FM)). The transmitted information may also be provided to the viewer via, for example, a personal loudspeaker, headset, or "ear bud." The transmitted information may include either the descriptions only or both the descriptions and the audio track of the program.

A corresponding apparatus for providing described television services according to the present invention includes a computer for receiving and storing description data corresponding to an audiovisual program; an encoder for encoding the description data into a program signal corresponding to the audiovisual program and transmitting the encoded program signal; a receiver for receiving the encoded program signal, extracting the description data from the encoded program signal, and outputting the description data; a text-to-speech converter for converting the description data into a speech signal corresponding to the description data; and a speaker for providing the speech signal to a viewer.

A corresponding method for providing described television services according to the present invention includes the steps of generating description data corresponding to an audiovisual program; encoding the description data into a program signal of the audiovisual program; transmitting the encoded program signal; receiving and decoding the encoded program signal, whereby the description data is extracted from the encoded program signal; converting the description data to a speech signal corresponding to the description data; and providing the speech signal to a viewer. The described television text may be compressed prior to encoding into the audiovisual program signal and decompressed at the receiver.

In a second embodiment of the present invention, description data is prepared by one or more caption editors and stored in a file along with corresponding time code information from the program signal of the audiovisual program for which the description is provided. The description data is subsequently transmitted to a speech synthesizer which generates a speech signal corresponding to the description data. Alternatively, the description data may be spoken by a person and recorded on a digital audio tape. The speech signal from the speech synthesizer or digital audio tape is mixed with the audio track of the video program to create a combined audio signal including both the original audio track of the video program and the speech signal. The combined audio signal is inserted, for example, into the SAP channel and transmitted simultaneously with the normal video signal and soundtrack of the video program.

In this embodiment, the need for encoding and decoding the description data is eliminated. Also, interference and/or bandwidth concerns are eliminated because the description data is not transmitted as part of Line 21 or other line of the vertical blanking interval of the video signal. Moreover, consumers can use existing SAP receivers (built-in to stereo television sets) to receive described television services.

A corresponding method for providing described television services according to the present invention includes the steps of generating description data corresponding to an audiovisual program; storing the description data into a file which also includes corresponding time code signals from the video program; converting the description data to a speech signal corresponding to the description data using, for example, a speech synthesizer or a digital audio tape recorder; mixing the speech signal with a soundtrack of the video program to provide a combined audio signal; and simultaneously transmitting the video program and the combined audio signal to a viewer. The combined signal may be transmitted to the viewer via the SAP channel.

The foregoing and other features, aspects, and advantages of the present invention will become more apparent from the following detailed description when read in conjunction with the accompanying drawings.

DETAILED DESCRIPTION

Figure 1:
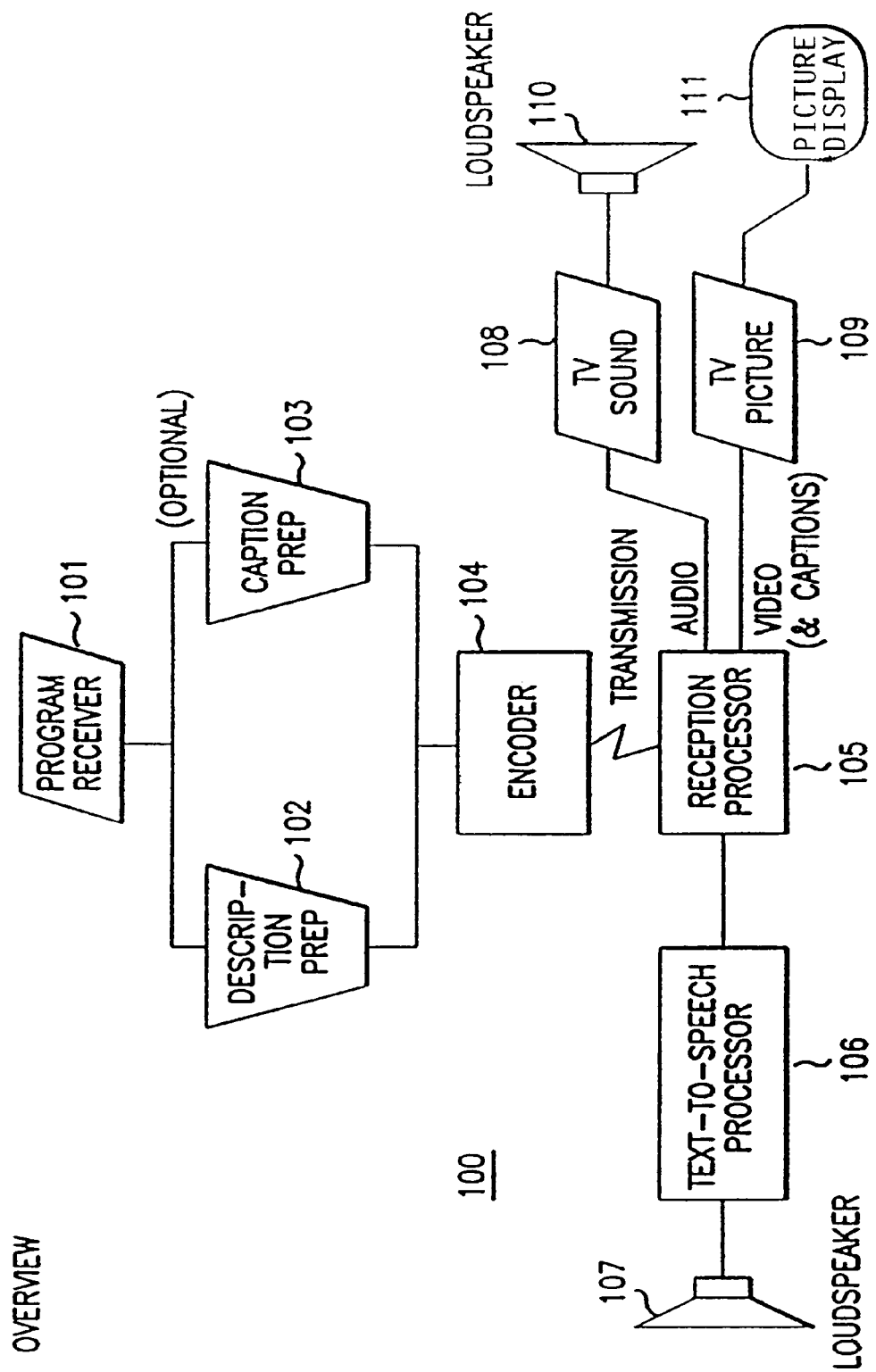
FIG. 1 provides a block diagram of a first embodiment of an apparatus for providing described television services according to the present invention.

With reference to FIG. 1, an apparatus 100 for providing described television services according to the present invention includes a receiver 101, an apparatus which receives a television program to be described; a description preparation apparatus 102 such as a personal computer by which receives a text description of the program to be described entered by a stenotypist, caption editor or typist and generates and stores description data; and an encoder 104 which inserts the description data into, for example, line 21 of the program's vertical blanking interval. An optional caption preparation apparatus 103 may be used which receives caption text entered by a stenotypist or typist and generates and stores caption data. The caption data is preferably entered and stored in the same computer as is the description data. The caption data is also inserted into line 21 of the vertical blanking interval of the program signal by encoder 104. The encoder 104 then transmits the program signal, including the description data and caption data (optional) to a receiver which may take the form of, for example, a set-top unit or a built-in unit for a viewer television set.

Description data may also be provided using Automated Live Encoding (ALE) wherein the network video is broadcast live and description data (and caption data) are provided to the encoder from a remote location (where description data is prepared) via modem. According to this embodiment of the system according to the present invention, a permanent record of the description data (and caption data) would be stored at the location where description data is prepared, but not at the network or post production location. The same process is repeated each time a program is broadcast with description and/or caption data. A system for displaying and encoding data such as that described in U.S. Ser. No. 08/215,567, filed Mar. 22, 1994, incorporated herein by reference, may be used in this embodiment of the present invention.

The program receiver 101 may receive the program to be described, for example, via live transmission, via satellite, via cable, via fiber-optic cable, or from a pre-recorded tape. The descriptions are then prepared using a standard captioning system which may be proprietary or off-the-shelf. The hardware for such captioning systems may be, for example, an IBM®, Apple® Macintosh®, or Unix® personal computer. However, any suitably equipped computer may be used. Software used to prepare the description data may be the same as is used to prepare caption data. Available captioning programs include "Captivator"™ by Cheetah Systems™ of Fremont, Calif., as well as other programs available form BASYS Automation Systems™ of Yonkers, N.Y.; Closed Captioning Services™ of Grand Rapids, Mich.; and SoftTouch™ of Alexandria, Va. These companies offer software for the creation of real-time captions, off-line captions, or both.

Also, an automatic speech recognition system such as that described in U.S. patent application Ser. No. 08/398,585, filed Mar. 2, 1995 and entitled "Automatic Speech Recognition System and Method for Closed Caption Production and Presentation," incorporated herein by reference, may also be used to prepare the description data in the apparatus according to the present invention.

The operation of the "head end" of the apparatus according to the present invention at which the description data is generated and later transmitted to individual viewers will now be described in detail. Working from an audiovisual program to be described, a description editor (a person) prepares descriptions for the program. The editor enters the descriptions into a computer equipped using a captioning software program such as any of those listed above. The descriptions are entered using a standard time code which enables coordination of the audio track of the program (e.g., dialogue and sound effects) and the description. As a result, the descriptions are provided at intervals during the program when dialogue and/or sound effects are absent or less prominent.

For example, in generating a description for the movie "The Terminator "™, after the Terminator says "I'll be back," the description editor may add the following description: "The Terminator turns and walks out of the police station." Similarly, after loud noises are heard, the description editor inserts the following description: "The Terminator rams his van through the front door of the police station and starts shooting."

This example also illustrates the compatibility between caption data and description data, in that there is little or no overlap at the time of presentation. Caption data is provided during dialogue intervals, while description data is provided during non-dialogue intervals. As a result, according to one embodiment of the apparatus according to the present invention, caption data and description data are simultaneously entered by the editor using the same software. In this way, the software program may advise the editor when transmission bottlenecks occur, thus allowing the editor to change the caption and/or description data to fit within the time constraints of the program.

The result of the preparation step in which description data and caption data (optional) are prepared is a computer file including text, time codes, and command information that is used by the encoder 104 to create a videotape and/or live broadcast of the program. The descriptions are simply another form of text information that is inserted into the television program signal, for example, into line 21, channel C1, C2 or EDS. However, any line of the vertical blanking interval may be used.

If both description and caption data are inserted into the same channel, for example, channel C1 of line 21, a marker, e.g., a binary marker, must be included to identify each type of data such that description data is not displayed as caption data and vice versa.

The encoder 104 may be located at a network or post production facility, such that the description data is provided to the network or post production facility via a modem or even via parcel post, for example, in the form of a computer diskette). The encoding of the description data into the video signal is then performed at a location remote from the place at which the description data is prepared.

Encoders for use as encoder 104 in the apparatus according to the present invention are available from EEG™ of Farmingdale, N.Y., and from SoftTouch™ of Alexandria, Va. Each channel of descriptions and captions (optional) is handled by a separate encoder. For example, to create a master encoded tape including description data and caption data, two encoders are arranged in series.

The output of the encoding process performed by encoder 104 may be provided to a video tape and/or output as a live television broadcast signal. In other words, the encoded signal may be recorded and/or transmitted normally. The videotape may be used to feed a subsequent television broadcast or as a master or submaster (a copy of the master tape which is a full generation down from the master tape and is used instead of the master tape in duplication to prevent overuse, misuse or damaging of the master tape) for duplication and home video distribution. Copies may be distributed using videocassette, video disks, CD-ROM, and other available forms. As long as the format remains in an NTSC format and any compression technique used preserves caption data, the descriptions (and captions) will remain intact.

The present invention is not limited to analog television applications, and may also be applied in digital television systems, for example, by intermixing the description data with caption data transmitted in a digital format.

With reference to FIG. 1, a receiver used in the apparatus according to the present invention includes a reception processor 105 which decodes the description data and caption data (if present). If both description and caption data have been inserted into line 21, the decoder uses markings encoded with the data to delineate description data from caption data. The reception processor 105 provides the description data to a text-to-speech processor 106 and caption data to a television picture generator 109.

The description data from the reception processor 105 is converted from a text format to an analog speech format in text-to-speech processor 106. The speech output is then provided to the viewer through loud speaker 107. Other forms of transmitting the speech output to the viewer, such as through a wired or wireless personal speaker, headset, or ear bud, are also contemplated within the scope of the present invention.

The reception processor 105 provides the program audio signal to the television sound system 108 which transmits the audio portion of the program to the viewer using, for example, loudspeaker 110. The reception processor 105 also provides the video signal of the program, including any caption data, to the television picture generator 109 which displays the video signal on picture display 111.

The reception processor 105 may simply pass through the received integrated signal to the television which provides integrated audio, video, and caption display. The description data is extracted and provided to the text-to-speech converter for processing. Caption data may also be provided to the text-to-speech converter if desired.

The viewer may obtain described television services off the air, via cable, or via video. The reception processor 105 extracts description characters from the received television program signal and stores these characters until a complete utterance has been received. A complete utterance is identified by receipt of an output code or "speak" command which tells the reception processor 105 to output the complete utterance to the text-to-speech processor 106. The text-to-speech processor 106 converts the description text into an analog format (i.e., speech) which is provided to the viewer via loudspeaker 107 or any other appropriate speaker means, e.g., a wired or wireless personal speaker, headset or ear bud (not shown).

The loudspeaker 107 which provides the synthesized voice generated by text-to-speech processor 106 to the viewer may be, for example, a secondary speaker associated with a set-top unit, or the built-in television speakers when the reception processor is built into the viewer's television set. Also, multiple text-to-speech synthesizers may be used to include a range of different voices.

Figure 2:
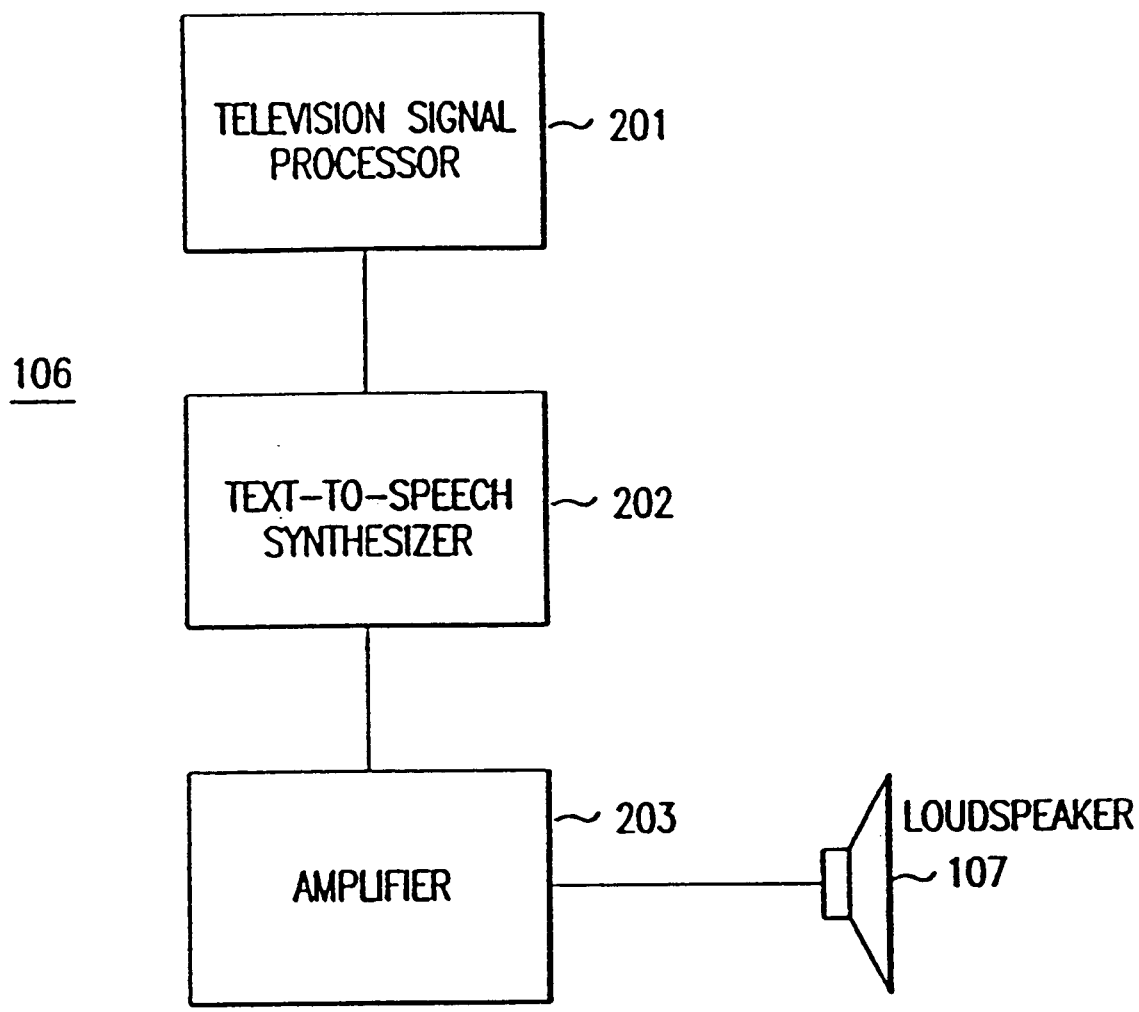
FIG. 2 provides a block diagram of the text-to speech processor provided at the viewer's location, for example, as a set-top or built-in unit of a television set.

With reference to FIG. 2, the text-to-speech processor 106 includes a television signal processor 201, a text-to-speech synthesizer (a digital-to-analog converter) 202, an amplifier 203, and loudspeaker 107. The signal processor 201 extracts description data, for example, from line 21, and stores the data until an output code is received. When an output code is received, the signal processor 201 sends the stored data to text-to-speech synthesizer 202 wherein an analog speech signal is generated. The speech signal is output to amplifier 203, where the signal is amplified and output to loudspeaker 107.

A number of off-the-shelf text-to-speech converters are available for use in the apparatus according to the present invention. These include products by Berkeley Speech Technologies of Berkeley, Calif. and Digital Equipment Corporation of Maynard, Mass. Text-to-speech converters may be simple integrated circuits that accept digital input characters and output an analog signal that, when amplified, are recognizable as speech. More sophisticated text-to-speech synthesizers use software programs which drive a loudspeaker, for example, of the type used in currently available multimedia personal computers. The system may also include a combination of these two types of synthesizers. According to one embodiment of the apparatus according to the present invention, a set-top decoder utilizes a built-in chip to synthesize the analog speech output.

The transmitted information (the synthesized speech) may include only descriptions, or also include the audio track of the program (stereo or mono) and/or a SAP track (e.g., in Spanish). Furthermore, a mixer (not shown) may be incorporated into the system to accept and mix the television program audio track (stereo, mono or SAP) as one input and the descriptions as a second input, thereby transmitting the two inputs as a single audio track. The output may be provided in monophonic or stereophonic sound.

In addition to support for prerecorded television programs as described above, the apparatus and method according to the present invention may be used for live performances, speeches, classrooms, and other types of presentations. Further, the apparatus and method according to the present invention may also be used for teleconferences, distance learning programs, and other televised programming in addition to movies and television series.

The input to the system may be a real-time stenographer trained to key in the description text which enables descriptions to be delivered with live programs such as news and sporting events.

The apparatus and method according to the present invention may also support multiple languages by including additional language descriptions which are also encoded in the program signal. For example, a Spanish-speaking person may receive both the Spanish SAP and Spanish descriptions simultaneously. In one embodiment, an automatic translation system may be used to translate the English text into text in a foreign language which is then "spoken" using the text-to-speech synthesizer.

According to one embodiment of the apparatus according to the present invention (not shown), an automatic translation device is inserted between the reception processor 105 and the text-to-speech processor 106 whereby the English description text is translated into a desired foreign language such as Spanish prior to the text-to-speech conversion process.

Another embodiment (not shown) of the apparatus according to the present invention includes a data compression device by which the described television text may be compressed prior to encoding into the audiovisual program signal by encoder 104 and decompressed by reception processor 105. Digital audio or text compression may be utilized to conserve bandwidth for both the description data and caption data. Compression and decompression may be accomplished, for example, using any known compression/decompression algorithm.

Figure 3:
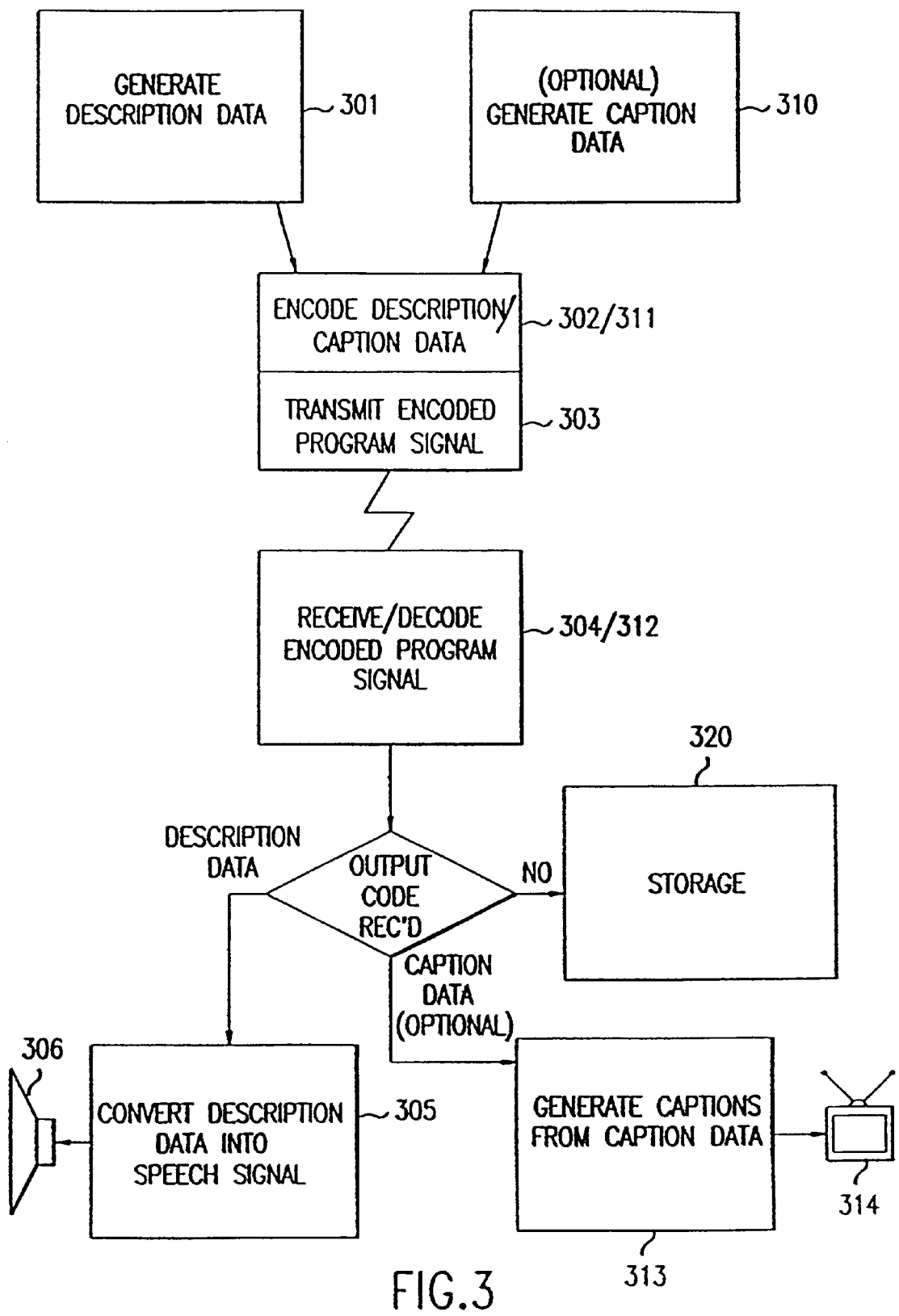
FIG. 3 provides a diagram of a first method of providing described television services according to the present invention.

With reference to FIG. 3, a method for providing described television services includes the steps of (301) generating description data corresponding to an audiovisual program; (302) encoding the description data into a program signal of the audiovisual program; (303) transmitting the encoded program signal; (304) receiving and decoding the encoded program signal, whereby the description data is extracted from the encoded program signal and stored in storage 320 until an output code is received, such that, in response to the output code, the description data is output to a text-to-speech converter; (305) converting the description data to a speech signal corresponding to the description data; and (306) providing the speech signal to a viewer. The method may also include the steps of (310) generating caption data corresponding to the audiovisual program; (311) encoding the caption data into the program signal; (312) extracting the caption data from the received encoded program signal; (313) generating captions from the caption data; and (314) displaying the caption data to the viewer.

The method of providing described television services according to the present invention may also include the steps (not shown) of compressing the description data and caption data (optional) prior to encoding the description data and caption data into the program signal and decompressing the description data and caption data prior to generating a speech signal from the description data and captions from the caption data. The data compression may be performed using any of the many known compression/decompression algorithms.

Figure 4:
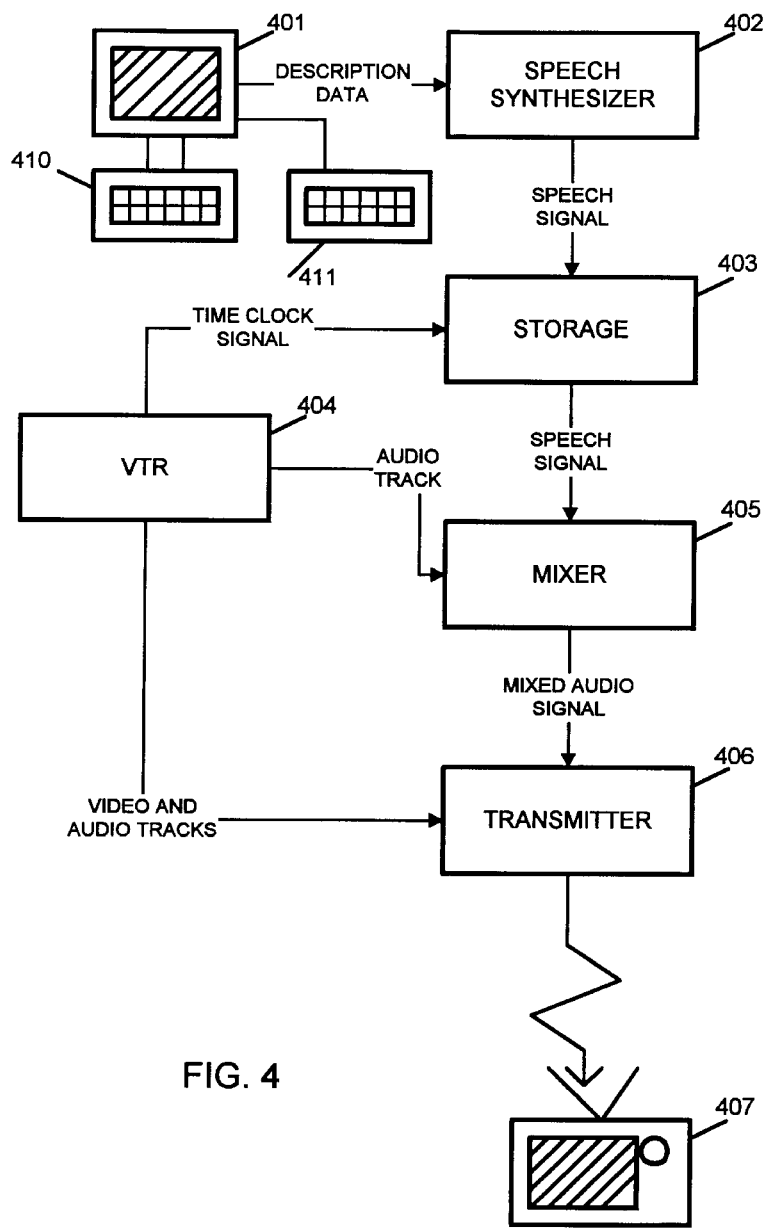
FIG. 4 provides a block diagram of a second embodiment of the apparatus for providing described television services according to the present invention.

A second embodiment of an apparatus for providing described television services for an audiovisual program is illustrated in FIG. 4. This apparatus includes an input terminal 401 into which description data is input by one or more caption editors; a speech synthesizer 402 which converts the description data into a speech signal; a storage unit 403 for storing the speech signal along with an accompanying time code signal provided, for example, from VTR 404; and a mixer 405 which receives the speech signal and mixes it with the audio signal from the audiovisual program using the time code signals from the program. The mixed audio signal including both the audio track of the audiovisual program and the description speech signal is transmitted by transmitter 406 to a viewer's television set 407, for example, via the SAP channel, simultaneously with the video signal and the audio track of the audiovisual program. As suggested in connection with the above-described first embodiment of the present invention, the description data may be automatically translated into a selected foreign language via an automatic translator (not shown) known in the art prior to providing the description data to the text-to-speech synthesizer.

The speech synthesizer 402 may be an off-the-shelf text-to-speech circuit or software program which converts text into an audio speech signal as described above with reference to FIGS. 1 and 2. The input terminal 401 may be a desktop computer having an attached keyboard 410 for entering the description data. A real-time stenographer keys in the description text via a second keyboard 411 such as a steno-keyboard connected to terminal 401 which enables descriptions to be delivered with live programs such as news and sporting events.

The storage unit 403 may be a hard drive attached to the desktop computer. The mixer circuit 405 may be a summing circuit which sums the audio signal from the soundtrack of the audiovisual program with the speech signal produced by the speech synthesizer 402. The transmitter 406 may be a radio frequency broadcast transmitter, cable television transmitter, direct broadcast satellite transmitter or other suitable type of television transmitter known in the art.

Figure 4A:
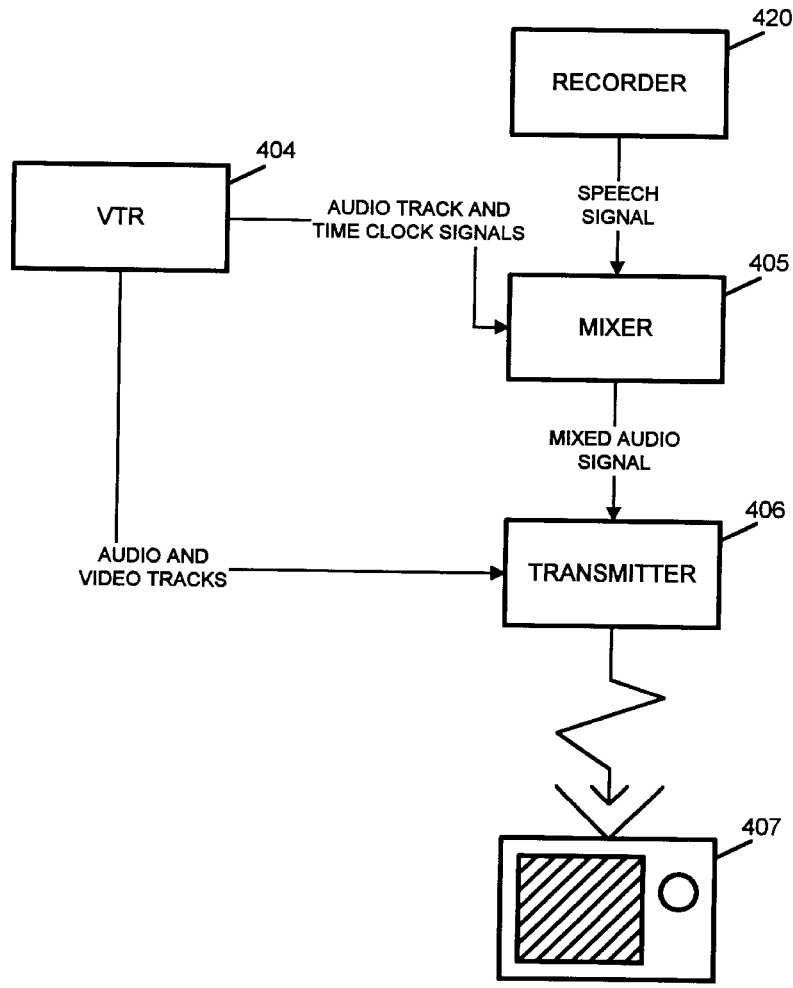
FIG. 4A provides a block diagram of a third embodiment of the apparatus for providing described television services according to the present invention.

A third embodiment of the apparatus for providing described television services according to the present invention is shown in FIG. 4A. The apparatus in FIG. 4A includes the storage unit 403, VTR 404, mixer 405, transmitter 406, and viewer television set 407 as shown in FIG. 4. However, in the embodiment illustrated in FIG. 4A, the description data is generated by one or more human speakers who input (i.e., speak) the description data in the form of an analog signal into a recorder 420, for example an analog or digital audio tape (DAT) recorder. The recorder 420 creates a digital audio tape of the description data. Subsequently, the recorder 420 outputs the recorded digital speech signal which is synchronized to the master video tape of the audio visual program played by VTR 404 using time code signals by mixer 405. The mixer 405 then mixes the synchronized speech signal in real time to interleave the digital speech signal with the sum of the left and right stereo audio channels or with the mono audio signal of the audiovisual program. Transmitter 406 feeds the combined signal including the audio track of the audiovisual program and the digital speech signal directly in to the SAP channel which is transmitted to the viewer's television 407.

According to this embodiment of the apparatus for providing described television services according to the present invention, a foreign language (e.g., Spanish) SAP signal may be transmitted in addition to the speech signal. The foreign language SAP signal may be transmitted either without any accompanying speech signal (description data) or mixed with a corresponding speech signal in the foreign language.

Figure 5:
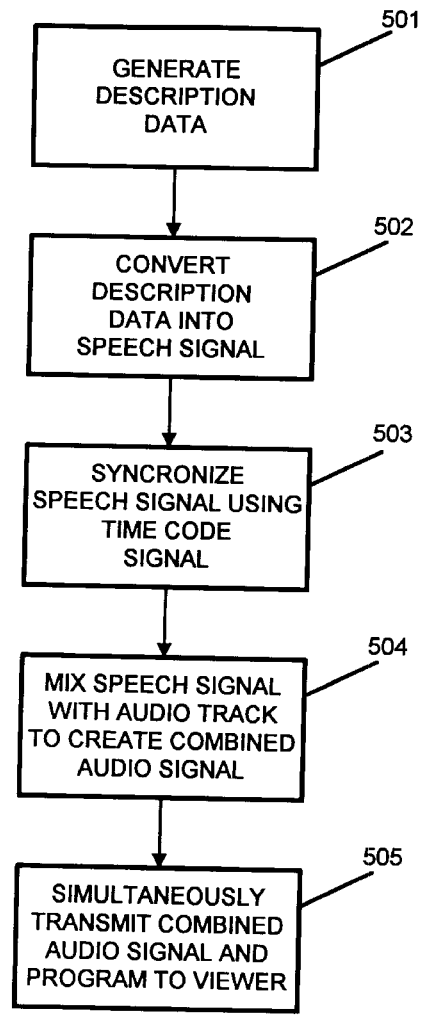
FIG. 5 provides a diagram of a second method of providing described television services according to the present invention.

A method of providing described television services according to the second embodiment of the present invention is illustrated in FIG. 5. This method includes the steps of (501) generating description data corresponding to an audiovisual program; (502) converting the description data to a speech signal corresponding to the description data using, for example, a text-to-speech synthesizer or a recorder which records a human speaker; (503) synchronizing the speech signal with the audiovisual program using a time code signal from the audiovisual program; (504) mixing the synchronized speech signal with the audio track of the audiovisual program to create a combined audio signal; and (505) simultaneously transmitting the combined audio signal and the audiovisual program to the viewer by a suitable transmission apparatus as described above. The combined audio signal may be transmitted to the viewer, for example, over the SAP channel which is received by television sets having stereo capacity. Therefore, the customer does not need special equipment to receive the described television services.

This method according to the present invention may also include a translation step to support multiple languages. For example, the English text may be translated into text in a foreign language by a translator (not shown), for example, a translating device or a human translator. The translated text is provided to the text-to-speech synthesizer 402 (FIG. 4) or recorder 420 (FIG. 4A).

In addition to support for prerecorded television programs as described above, the apparatus and method according to the present invention may be used for live performances, speeches, classrooms, and other types of presentations. Further, the apparatus and method according to the present invention may also be used for teleconferences, distance learning programs, and other televised programming in addition to movies and television series.

While the present invention has been particularly described with reference to the preferred embodiments, it should be readily apparent to those of ordinary skill in the art that changes and modifications in form and details may be made without departing from the spirit and scope of the invention. It is intended that the appended claims include such modifications.

Claimed is:

1. An apparatus for providing described television services, comprising:

description data receiving means for receiving description data corresponding to an audiovisual program;

a translator for translating said description data into a foreign language;

a text-to-speech converter for converting said description data into a speech signal corresponding to said description data;

storage means for receiving and storing said speech signal and a corresponding time code signal from the audiovisual program; and a mixing circuit for mixing said retrieved speech signal with the audio track of the audiovisual program according to said time code signal to produce a combined audio signal.

2. An apparatus for providing described television services, comprising:

a translator for translating description data into a foreign language;

recording means for recording a speech signal corresponding to said description data for an audiovisual program;

synchronizing means for synchronizing said speech signal with the audiovisual program using a time code signal from the audiovisual program; and a mixing circuit for mixing said synchronized speech signal with the audio track of the audiovisual program to produce a combined audio signal.

3. A method for providing described television services, comprising the steps of:

generating description data corresponding to an audiovisual program;

translating said description data into a foreign language;

converting said description data to a speech signal corresponding to said description data;

synchronizing said speech signal with the audiovisual program using a time code signal from the audiovisual program; and mixing said synchronized speech signal with the audio track of the audiovisual program to create a combined audio signal.

4. Apparatus for providing described television services comprising means for generating a description data signal, said description data signal representing descriptive data comprising auxiliary data transmitted for describing a non-verbal portion of an audiovisual program, means for marking said description data signal, means for inserting said marked description data signal into a channel for closed captioning data, and means for transmitting said closed captioning data channel.

5. The apparatus of claim 4 wherein said closed captioning data channel is simultaneously applied for closed captioning for the hearing-impaired.

6. The apparatus of claim 5 wherein said marking step comprises marking said description data differently from closed captioning data.

7. The apparatus of claim 4 wherein said closed captioning data channel is a separate channel from one applied for closed captioning data for an audio portion of an audiovisual program.

8. The apparatus of claim 1 wherein said description data receiving means is responsive to one of a marker for marking said description data or a separate channel from a closed caption data channel representing an audio portion of said audiovisual program.

9. The apparatus of claim 2 further comprising one of a marking means for marking said descriptive data or receiving means responsive to a separate channel from a closed caption data channel representing an audio portion of said audiovisual program.

10. The method of claim 3 further comprising the step of one of marking said description data or transmitting said description data on a separate channel from a closed caption data channel representing an audio portion of said audiovisual program.

11. Apparatus for providing described television services, comprising:

a translator for translating description data for an audiovisual program into a foreign language, recording means for recording a speech signal corresponding to said translated description data for said audiovisual program, synchronizing means for synchronizing said speech signal with an audio track signal of said audiovisual program using a time code signal from said audiovisual program, and a mixing circuit for mixing said synchronized speech signal with said audio track signal of said audiovisual program to produce a combined audio signal.

12. The apparatus of claim 11 wherein said description data comprises auxiliary data transmitted for describing the non-verbal portion of an audiovisual program.

* * * * *